(12) United States Patent
Bella

(10) Patent No.: US 8,536,738 B2
(45) Date of Patent: Sep. 17, 2013

(54) SYSTEM FOR TRANSFERRING ENERGY WIRELESSLY

(75) Inventor: Valter Bella, Turin (IT)

(73) Assignee: Telecom Italia S.p.A., Milan (IT)

( * ) Notice: Subject to any disclaimer, the term of this patent is extended or adjusted under 35 U.S.C. 154(b) by 67 days.

(21) Appl. No.: 13/319,178

(22) PCT Filed: May 7, 2009

(86) PCT No.: PCT/EP2009/003269
§ 371 (c)(1),
(2), (4) Date: Nov. 7, 2011

(87) PCT Pub. No.: WO2010/127685
PCT Pub. Date: Nov. 11, 2010

(65) Prior Publication Data
US 2012/0049650 A1    Mar. 1, 2012

(51) Int. Cl.
*H01F 38/00* (2006.01)
(52) U.S. Cl.
USPC ......................................................... 307/104
(58) Field of Classification Search
USPC ......................................................... 307/104
See application file for complete search history.

(56) References Cited

U.S. PATENT DOCUMENTS

| | | | |
|---|---|---|---|
| 5,596,567 A | 1/1997 | deMuro et al. |
| 6,960,968 B2 | 11/2005 | Odendaal et al. |
| 7,271,569 B2 | 9/2007 | Oglesbee |
| 2002/0028653 A1 | 3/2002 | Chadwick |
| 2007/0279002 A1 | 12/2007 | Partovi |
| 2008/0067874 A1 | 3/2008 | Tseng |
| 2009/0058746 A1 | 3/2009 | Delgado et al. |

OTHER PUBLICATIONS

International Search Report and Written Opinion mailed Jan. 26, 2010, PCT/EP2009/003269.
A. Karalis et al. "Efficient wireless non-radiative mid-range energy transfer" Annals of Physics 323 (2008) 34-48 (available online Apr. 27, 2007).

*Primary Examiner* — Rexford Barnie
*Assistant Examiner* — Dru Parries
(74) *Attorney, Agent, or Firm* — Banner & Witcoff, Ltd.

(57) ABSTRACT

There is disclosed a system for transferring energy wirelessly by an evanescent electromagnetic field. The system includes a housing including electrically conducting walls defining a space and an injector configured to inject electromagnetic waves into the space. A wall of the housing is configured to be placed adjacent to an electromagnetic energy reception device and includes one or more apertures. The frequency of the electromagnetic waves is lower than the cutoff frequency of the housing, and the one or more apertures have a size smaller than the waves wavelength so that an evanescent electromagnetic field is emitted from the one or more apertures of the wall and may reach the energy reception device.

17 Claims, 9 Drawing Sheets

ME

MC

MQ

SYSTEM FOR TRANSFERRING ENERGY WIRELESSLY

CROSS REFERENCE TO RELATED APPLICATIONS

This is a U.S. National Phase Application under 35 U.S.C. §371 of International Application No. PCT/EP2009/003269, filed May 7, 2009, which was published Under PCT Article 21(2), the entire contents of which are incorporated herein by reference.

FIELD OF THE INVENTION

The present invention relates to a system for transferring energy wirelessly.

More in particular the present invention relates to a system that is adapted to transfer energy to an electromagnetic energy reception device embedded in a mobile electronic device, such a mobile phone or a notebook, or in a battery pack, such as the rechargeable battery packs used in mobile phones and notebooks.

BACKGROUND OF THE INVENTION

The idea of transmitting energy wirelessly is more than a century old. At the end of the nineteenth century, the famous scientist Nikola Tesla researched ways to transmit large amounts of energy over long distances.

More recently, a number of solutions have been disclosed relating to the transmission of energy over shorter distances for consumer electronics applications.

U.S. Pat. No. 7,271,569 discloses a contactless inductive charger having a generally planar surface. An image, text or other visual indicator is disposed upon the substantially planar surface such that the visual indicator represents a preferred placement orientation for an electronic device for optimal inductive charging. The charger includes a primary coil positioned within the boundaries of the image, such that a user has a visual guide for placing the device on the charging surface for maximum efficiency in charging. The visual indicator, which may be a picture, outline, text or other directional indicator, may be geometrically similar to a shape of the electronic device or may be in the shape of a generic device.

Patent application US 2007/0279002 discloses a power source, a charging system, and an inductive receiver for mobile devices. A pad or similar base unit comprises a transmitter, which creates a magnetic field by applying an alternating current to a winding, coil, or any type of current carrying wire. A receiver comprises a means for receiving the energy from the alternating magnetic field and transferring it to a mobile or other device. The transmitter and/or the receiver may comprise a plurality of current carrying wires disposed adjacent to each other; different shapes and arrangements of the wires are considered.

Patent application US 2008/0067874 discloses a method and system for transferring power wirelessly to electronic devices. The system can utilize magnetic coupling between two coils at close proximity to transfer sufficient power to charge an electronic device. Embodiments pertain to an array of spiral coils that can be used to transmit power for transfer to receiver coils. Various embodiments can be referred to as PowerPad system. Embodiments can incorporate one or more of the following: planar inductors, PCB transformers, and very high frequency power supplies. Embodiments also pertain to planar inductors having characteristics that allow the production of even magnetic field, as well as systems that incorporate such planar inductors.

U.S. Pat. No. 5,596,567 discloses a battery charger and battery pack that are each provided with a wireless communications device to communicate over a wireless channel. The battery charger receives charging information from a memory housed in the battery pack, and commences a recharge process in accordance with the received information when the battery pack is electrically coupled to the charger.

U.S. Pat. No. 6,960,968 discloses a planar resonator for contactless power transfer using at least two electrically-isolated axis-aligned spiral-shaped conductors in a coupled inductor or transformer configuration. Signal or power transfer is then accomplished by coupling of magnetic flux. The coupling of electric flux is also accomplished. The first and second conductors have a predetermined self-resonant frequency. The resonator stores electric energy in an interface and at predetermined frequencies; the arrangement of the first and second conductors and the interface permits transfers of magnetic flux and electrical energy between the first and second conductors across the interface. The resonator facilitates contactless battery charging in devices such as cell phones and wearable electronics when the resonator can be woven into fabric or attached to a person's clothes.

The article by A. Karalis, J. D. Joannopoulos, M. Soljacic entitled "Efficient wireless non-radiative mid-range energy transfer" investigates whether, and to what extent, the physical phenomenon of long-lifetime resonant electromagnetic states with localized slowly-evanescent field patterns can be used to transfer energy efficiently over non-negligible distances, even in the presence of extraneous environmental objects.

SUMMARY OF THE INVENTION

The Applicant has considered the prior art solutions and has realized that the transfer of energy by electromagnetic waves is still problematic as it is quite inefficient due to the fact that electromagnetic waves are radiated in any direction (so only a limited amount of energy can be received) and that the radiation pattern is far from being uniform (so the energy that can be received varies from point to point).

A simple way to overcome these problems is by increasing the radiated power but this solution causes (A) waste of energy into the environment, (B) electromagnetic interferences, and (C) health risks for the exposed living beings.

The solution according to U.S. Pat. No. 7,271,569 is based on a spread radiative field, in particular the induction phenomenon is used, and requires a very good alignment between transmitter and receiver in order to achieve a reasonable degree of efficiency in the energy transfer; additionally, the specific arrangement of a ferromagnetic-core coil leads to a non-uniform field and sensitiveness to the direction of placement of the receiver.

The solutions according to US 2007/0279002 and US 2008/0067874 are based on a spread radiative field, in particular the induction phenomenon is used, and suggest the use of a plurality of "current carrying wires" in order to generate a somehow uniform field; anyway, energy is wasted especially due to the "wires" being non-coupled or weakly-coupled to the energy receiver.

In the solution according to U.S. Pat. No. 5,596,567, the wireless technology is used only for data transfer and not for energy transfer.

The solution according to U.S. Pat. No. 6,960,968 is based on a spread radiative field (both coupling of the magnetic flux and the electric flux seems to be achieved) and suggests using resonance in order to achieve a reasonable degree of efficiency in the energy transfer.

The solution according to the article by Karalis uses spread evanescent electromagnetic waves for transferring energy "mid-range"; in order to achieve reasonable degree of efficiency in the energy transfer, high-level resonance is used between the transmitter and the receiver; the arrangement considered by this article simply consists of two wire loops distant from each other. The transmitter (i.e. one of the loop) inevitably spreads other types of electromagnetic waves (and the associated energy), i.e. those relating to the near-field radiative electromagnetic field and those relating to the far-field radiative electromagnetic field.

It is the main object of the present invention to provide a system for transferring energy wirelessly to an electromagnetic energy reception device that is more efficient in terms of energy transfer than the prior art solution especially adapted for "short-range" applications.

It is a first further object of the present invention to provide a system that does not create problems in terms of electromagnetic interference.

It is a second further object of the present invention to provide a system that does not create problems in terms of health risks due to electromagnetic irradiation.

It is a third further object of the present invention to provide a system that allows placement of the electromagnetic energy reception device with a certain freedom.

It is a fourth further object of the present invention object to provide a system that is safe.

It is a fifth further object of the present invention to provide a system that has a simple and economic construction.

The Applicant has decided to use the evanescent electromagnetic field for transferring energy; in this way, the energy may reach in practice only a limited distance from the source of the evanescent electromagnetic field.

The Applicant has conceived to use a source of electromagnetic field, e.g. a coil, but to confine any electromagnetic field other than the evanescent electromagnetic field within a housing, e.g. a housing provided with electrically conducting walls; in this way, substantially no energy is wasted.

The Applicant has also conceived to control the spatial distribution of the emitted electromagnetic field; this is achieved by one or more appropriate apertures located on a surface where the electromagnetic energy reception device is to be leant on.

In general, the emission device comprises a housing and an injector; the housing (for example box-shaped) defines an internal space by means of electrically conducting walls; the injector (for example a coil), supplied by an oscillator generating an electrical signal, is adapted to inject electromagnetic waves into this space (and it is also typically located inside the space); a wall of the housing is adapted to be placed adjacent to an electromagnetic energy reception device (for example embedded in a battery pack of a mobile phone) and is provided with at least one aperture. If the frequency of the electromagnetic waves is lower than the cutoff frequency of the housing and if the aperture has a size smaller than the wavelength of the electromagnetic waves, an evanescent electromagnetic field is emitted from said aperture, reaches the reception device and does not propagate much further.

In order to provide a certain freedom of placement of the electromagnetic energy reception device, the wall of the housing may be provided with a plurality of apertures; preferably, these apertures are located adjacent to each other and have a hexagonal shape.

By appropriately choosing the size of the aperture or apertures as well as (in case of more than one aperture) the number and position of the apertures, it is possible to very precisely control the spatial distribution of the emitted evanescent electromagnetic field.

In order to have high performances, the waves frequency is advantageously at least ten times lower than the cutoff frequency and the size of the aperture or apertures is advantageously at least ten times smaller than the waves wavelength.

In order to avoid possible health risks, the waves frequency is advantageously smaller than 100 KHz; in fact, at such low frequencies, even SAR [Specific Absorption Rate] measurements are not required. Additionally, at such low frequencies, the above mentioned conditions relating to frequencies and wavelengths are always met by a hand-held housing and any aperture thereon.

As far as safety is concerned, the energy transferring system may be provided with a sensor for detecting whether an object is leant on the emitting wall of the housing and/or with a sensor for measuring the emitted evanescent electromagnetic field; in this way, the system may be arranged so that energy emission occurs only if an appropriate device is associated to the system.

Additionally, an alarm device may be provided for signalling anomalous emitting situations.

BRIEF DESCRIPTION OF THE DRAWINGS

The present invention will become more apparent from the following description to be considered in conjunction with the annexed drawing, wherein.

Figure 1B:
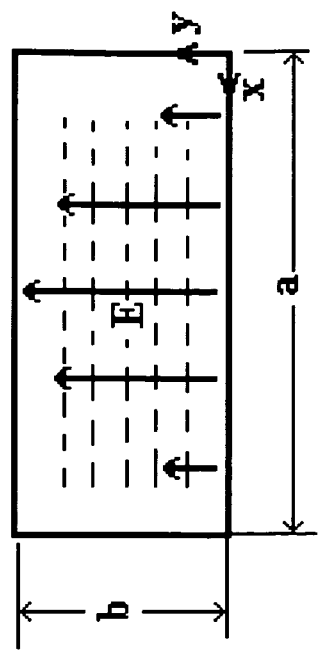
FIG. 1 shows a waveguide, its dimensions and the fields therein.

It is to be understood that the following description and the annexed drawings are not to be interpreted as limitations of the present invention but simply as exemplifications.

DETAILED DESCRIPTION OF THE INVENTION

Theoretical Considerations on Electromagnetic Fields

Maxwell's equations are a set of four differential equations that are basic for the study of electromagnetic phenomena. In fact, they govern the space and time evolution of electric and magnetic fields; in other words, they express relations between electric field, magnetic field, electric charge, electric current, time and spatial coordinates. These equations are well known and are the following:

$$\begin{cases} \nabla \cdot E = \dfrac{\rho}{\epsilon_0} \\ \nabla \times E = -\dfrac{\partial B}{\partial t} \\ \nabla \cdot B = 0 \\ \nabla \times B = \mu_0 J + \epsilon_0 \mu_0 \dfrac{\partial E}{\partial t} \end{cases}$$

If a source of electromagnetic waves is considered in the open space, these equations provide a solution for E (electric field) and B (magnetic field) that identifies three spherical and concentric space regions:

| type of field | name of region | distance |
|---|---|---|
| non-radiative field/ evanescent field | Reactive region | $R < 0.62\sqrt{\dfrac{D^3}{\lambda}}$ |
| near radiative field | Fresnel region | $0.62\sqrt{\dfrac{D^3}{\lambda}} < R < \dfrac{2D^2}{\lambda}$ |
| far radiative field | Fraunhofer region | $R > \dfrac{2D^2}{\lambda}$ | wherein D is the size of the source emitting electromagnetic waves, λ is the wavelength of the electromagnetic waves (the assumption is made that the source emits electromagnetic waves having the same wavelength), and R is the distance from the centre of the source.

As far as the evanescent waves are concerned, their energy is emitted in a pulsating way; this name "evanescent" is due to the fact that this type of electromagnetic field decays very rapidly with the distance from the source (it is an exponential decay).

It is to be highlighted that the three types of field are present in all three regions; however, only one of them is predominant in a particular region.

In general, an electromagnetic field generated by a source depends from the characteristics of the source and from the characteristics of the space where the source is located, and may be considered the superposition of the above-mentioned three types of field.

One concept that lies behind the present invention is the idea of using the "evanescent field" for transferring energy.

A second concept related with the present invention is that of using a conductive housing in order to shield any contribution to the overall electromagnetic field apart from that due to the "evanescent field"; electromagnetic waves are injected into the conductive housing by means of a so-called "injector", i.e. a little antenna.

A third concept related with the present invention, is that of using this conductive housing as a source of the "evanescent field"; in order to achieve this result, the conductive housing is provided with at least one aperture.

The conductive housing is in fact a waveguide that is operated so that no wave propagation occurs.

Figure 1A:
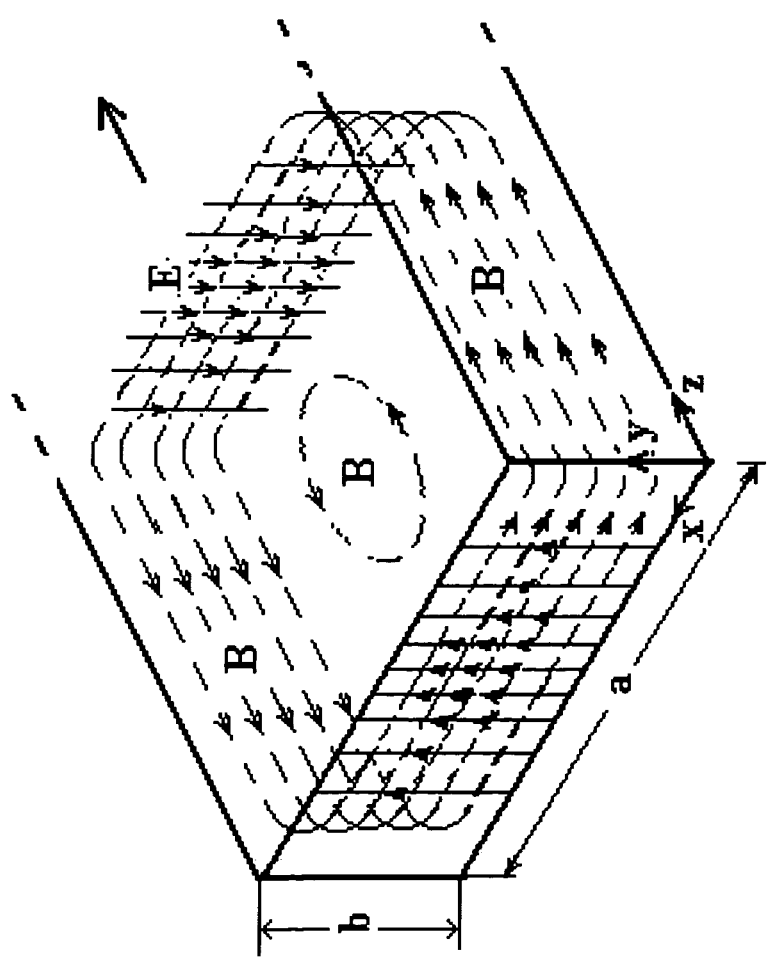

In FIG. 1, a waveguide having rectangular cross-section (x-y plane—a=width, b=height) and indefinite length (z axis) is schematically shown. In such a waveguide, there is a so-called "cutoff frequency" (and a corresponding "cutoff wavelength"—as it is well known between wavelength λ and frequency f the relation λ=c/f applies) below which waves do not propagate. The "cutoff wavelength" for each mode TEmn is given by the following formula:

$$\lambda_c := \dfrac{1}{\sqrt{\left(\dfrac{m}{2\cdot a}\right)^2 + \left(\dfrac{n}{2\cdot b}\right)^2}}$$

wherein "m" and "n" are the indexes of the propagation modes;

therefore, the "cutoff wavelength" does not depend on the length (z axis) of the waveguide.

For "TE10" mode, $\lambda_C := 2 \cdot a$; therefore, the "cutoff wavelength" depends only on the width "a" (x axis) of the waveguide.

According to Helmholtz' equation, by injecting an electromagnetic wave having wavelength equal to λi into a waveguide (e.g. the above mentioned housing) having cutoff wavelength $\lambda_C \ll \lambda i$, the injected electromagnetic wave does not propagate (a "standing field" or, more in general, a "quasi-standing field" establishes) and, near the injector, an evanescent non-radiative field E(x) is generated having the following strength:

$$E(x) = e^{i(\omega t - kx)} \Rightarrow E(x) = e^{i\omega t - \kappa x},$$

Wherein "x" is the distance from the injector "k" is the wave number and "κ=ik" is the imaginary wave number of the evanescent mode.

If, in the above mentioned situation, an aperture is provided on a wall (extending along the width) of the housing, for example the upper wall in FIG. 1, and the aperture is e.g. circular and has radius equal to "r", it is possible to predict how the evanescent field decays with the distance from the aperture. This possibility is very advantageous in the present invention as it allows the operation range of the system according to the present invention to be adjusted and therefore reduces the risks of electromagnetic interferences, health risks and heating of metallic parts of the electronic devices adjacent to the system.

Figure 2B:
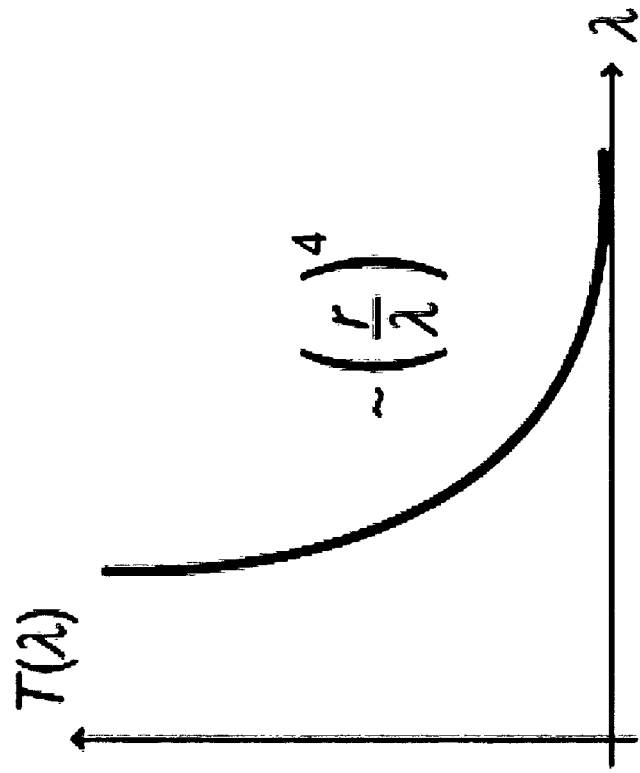
FIG. 2 shows the behaviour of a wall with an aperture therein when irradiated by electromagnetic waves.
Figure 2A:
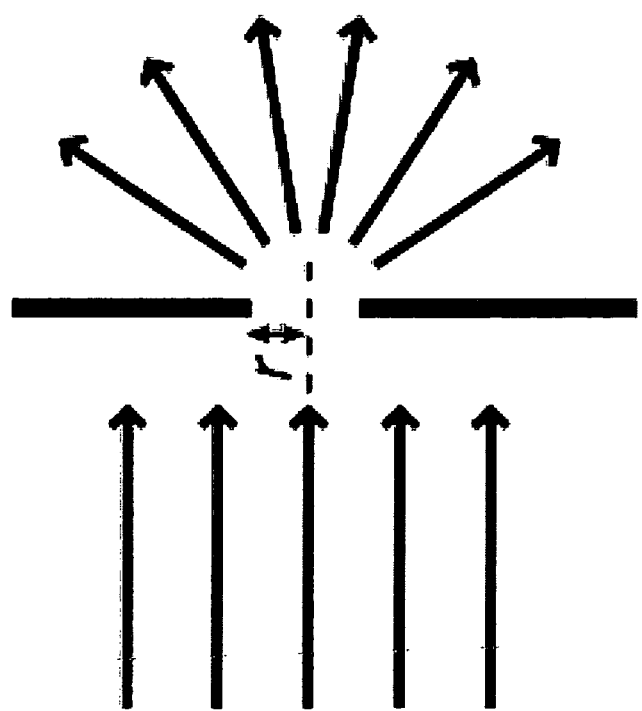

With reference to FIG. 2, if an electromagnetic wave having wavelength λ, such that $\lambda_C \ll \lambda$, is injected into a waveguide and is directed towards an aperture having radius r, such that $r \ll \lambda$, the evanescent field T(λ) that is emitted from the aperture decays quickly with the distance from the aperture according to $(r/\lambda)^4$.

General Description of an Embodiment

Figure 3:
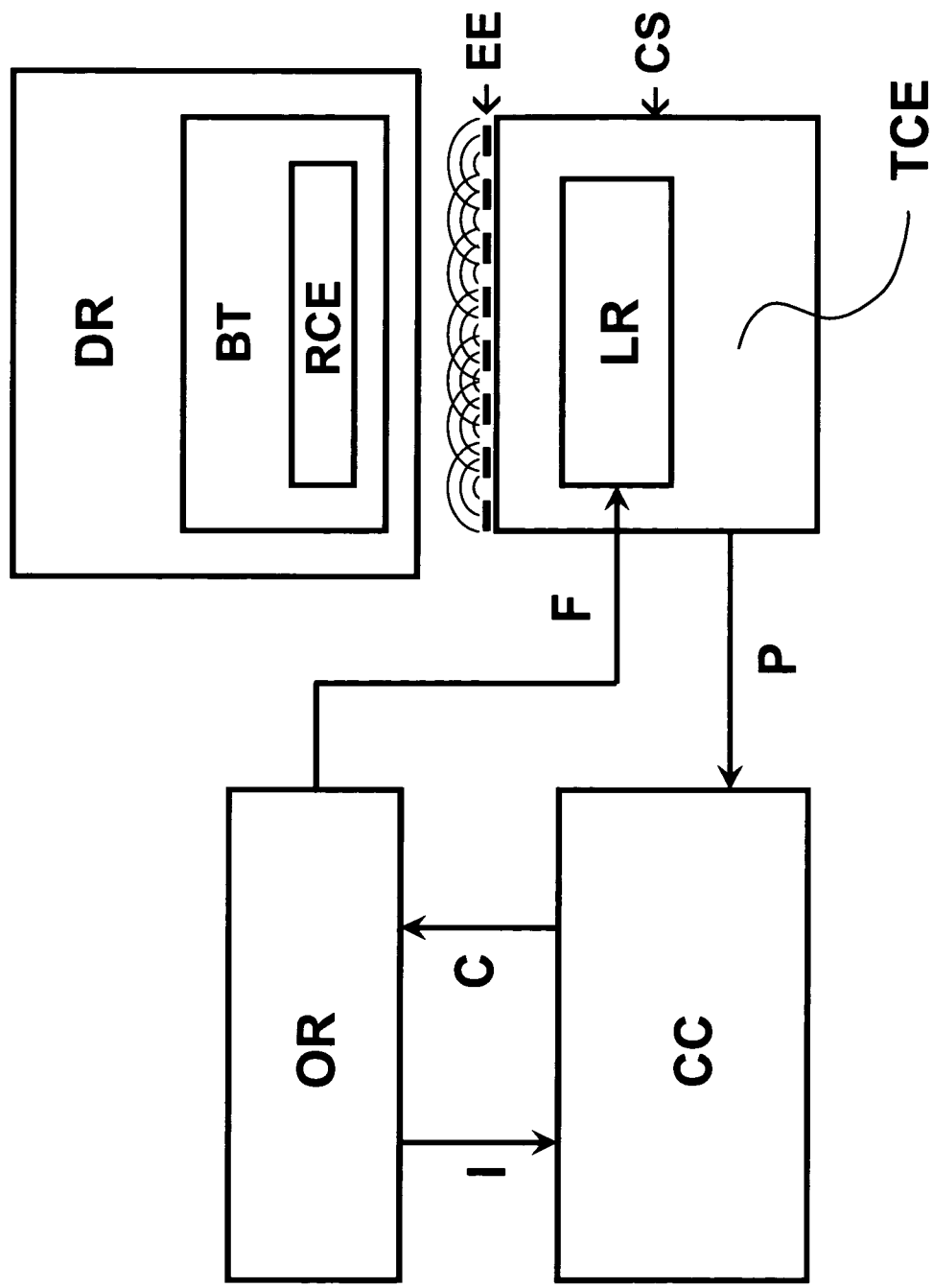
FIG. 3 shows a block diagram of a system according to the present invention.

FIG. 3 shows a block diagram of a system according to the present invention.

There is an oscillator OR, electrically power-supplied by e.g. a battery or a regulated power supply (both not shown), for generating an electrical signal, preferably sinusoidal.

There is an emission device TCE adapted to emit an evanescent field. The device TCE comprises a housing CS defining a closed internal space by means of walls made of electrically conducting material, and an injector LR adapted to inject electromagnetic waves into this internal space.

The output of the oscillator OR is connected to the input of the injector LR by wired electrical connection F.

The housing CS of FIG. 3 is box-shaped; however, it could be quite differently shaped; for example, it may have the shape of a mat such as a mouse pad. Its electrically conducting walls may be for example metallic solid walls or plastic solid walls covered by metallic layers.

The injector LR is typically a coil, located inside the internal space of the housing CS and, in addition to injecting electromagnetic waves into the internal space of the housing CS, it cooperates with the oscillator OR in generating the sinusoidal electrical signal.

The upper wall EE of the housing CS comprises a plurality of adjacent apertures for emitting the evanescent electromagnetic field. The number of apertures may vary from embodiment to embodiment; the minimum number is one while the maximum number may reach several thousands. In FIG. 3, the lobes corresponding to the fields of each aperture are shown; the overall evanescent electromagnetic field is given by the superposition of the single fields and thus is quite uniform above the upper wall EE and has a limited spatial range.

The number and the dimension of the apertures, as well as the distance between the apertures influences the uniformity of the evanescent electromagnetic field emitted. Preferably, distance between apertures is reduced to one or some millimeters and the apertures have an equivalent radius of about 1 cm (or several centimeters). Apertures are preferably equally spaced over the surface.

The housing CS is associated to a "cutoff wavelength" $\lambda_C$ that, in general, depends on its size and shape.

The sinusoidal electrical signal is at a frequency f, corresponding to a wavelength $\lambda$; this signal might be not-perfectly sinusoidal; in this case, the signal is associated to a narrow bandwidth and the above mentioned frequency f is the central frequency of the bandwidth; the use of a single frequency or a very narrow bandwidth is advantageous as it reduces the risk of interferences. It is to be noted that the present invention does not exclude that the oscillator generates a plurality of sinusoidal electrical signals at different frequencies; in this case, all the considerations about the above mentioned frequency f are to be repeated for each frequency of the oscillator.

The aperture or apertures have a size r; as it will be described better in the following, the aperture or apertures may have different shapes; if the aperture is a circle r is its radius, if the aperture is a square or rectangle r is its diagonal, if the aperture is a hexagon r is the radius of the circle containing the hexagon, and so on. Typically, when a plurality of apertures is used (as in FIG. 3 and FIG. 4), each of the apertures has the same shape and size; anyway, this is not strictly necessary.

The minimum relations between these quantities are the following:

$\lambda > \lambda_C$ and $r < \lambda$.

but it is preferable that the following relations hold:

$\lambda >> \lambda_C$ and $r << \lambda$.

wherein "<<" corresponds to a factor greater than ten; due to these relations, an evanescent field is emitted from the apertures of the wall EE.

The system according to the embodiment of FIG. 3 comprises further a control unit CC that is electrically connected to the device TCE through a wired connection P and to the oscillator OR through two wired connections I and C; the meaning of these connections will be explained later.

The emitted evanescent electromagnetic field is received by an electromagnetic energy reception device RCE that does not belong to the system according to the present invention.

In the embodiment of FIG. 3, device RCE is embedded into a battery pack BT of a mobile electronic device DR, in particular a mobile phone. Device RCE (and also the battery pack BT and the device DR) is located adjacent to the wall EE where the evanescent field is emitted; in particular, the housing of the device DR is leant on the wall EE and device RCE is very close to device TCE.

It is to be noted that, in FIG. 3, the distance between the devices TCE and RCE has been exaggerated for clarity of graphic representation.

Connection C is used for sending electrical signals from unit CC to oscillator OR in order to control the amplitude of the sinusoidal signal at its output; in particular and in the most simple case, this connection is used for switching "on" and "off" the oscillator OR and this corresponds respectively to "maximum amplitude" and "zero amplitude" (i.e. no sinusoidal signal).

Connection P is used for sending electrical signals from device TCE to unit CC in order to provide an information relating to the presence of an object leant on wall EE. This information could be for example the weight of the object or simply the presence of an object having a weight above a certain value; such detections may be carried out by e.g. one or more weight sensors; optical sensors might be used in alternative or in addition to weight sensors.

Connection I is used for sending electrical signals from oscillator OR to unit CC in order to provide information relating to the strength of the evanescent field emitted by the device TCE and received by the device RCE.

It is to be noted that the strength of this field depends not only on the oscillator OR, the injector LR and the wall EE but also (significantly) on the object which is placed adjacent to the wall EE. In fact, if it does not resonate at the frequency of the emitted electromagnetic waves, the object will behave like a high or medium impedance load and the strength will be relatively low; if it does resonate the object will behave like a low impedance load and the strength will be high; if it is e.g. a piece of metal the object will behave like a short-circuit and the strength will be extremely high.

The field strength is proportional to the amplitude of the sinusoidal electrical signal provided by oscillator OR to injector LR; in turn, the amplitude may be proportional e.g. to the power consumption of the oscillator OR.

The information relating to the field strength may be useful for determining e.g. what kind of objects is leant on wall EE. In fact, device RCE should be designed to resonate at the same frequency of the emitted evanescent field and therefore to let the device TCE emit a high field. If nothing is leant on the wall EE, the field strength will be low; if an animal or a hand of a human being is leant on the wall EE, the field strength will be medium; if a piece of metal is leant on the wall EE, the field strength will be extremely high.

The information relating to the present of an object (carried by connection P) and its nature (carried by connection I) may be used by unit CC for providing safety features; in fact, it is advantageous that the system according to the present invention does not radiate living beings (i.e. stops electromagnetic emission) and/or stops electromagnetic emission when a "short-circuit" at the electromagnetic level occurs.

Detailed Description of an Embodiment

Figure 4:
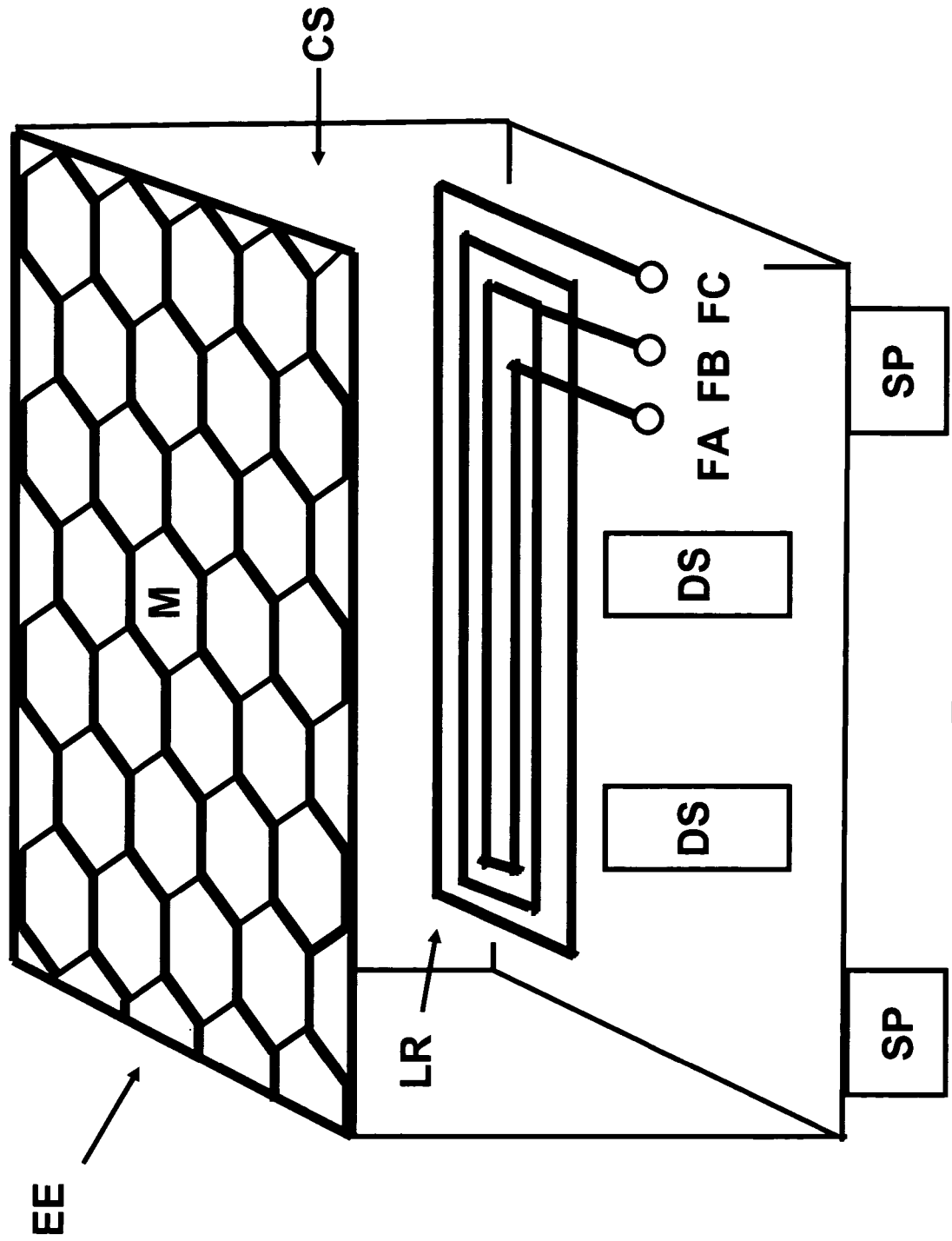
FIG. 4 shows a detailed diagram of the emission device of FIG. 3.

FIG. 4 shows a more detailed schematic diagram of device TCE of FIG. 3.

The housing CS is metallic and box-shaped and below it some weight sensors SP are located (only two of them are shown in FIG. 4); these are electrically connected to connection P.

The upper wall EE comprises a matrix M of metallic material having a plurality of closely adjacent hexagonal apertures, and an isolating solid wall of electrically isolating material just above matrix M; it is useful to avoid that small objects and/or particles enter the internal space from the apertures.

According to a specific embodiment, operating e.g. at a frequency of 95 KHz, the housing may have an upper wall of dimensions 20×25 cm with apertures having an equivalent radius of 1 cm and a distance between adjacent apertures (width of metallic or metallised material) of about 1 mm.

Alternatively, the housing CS may have dimensions of several tenths of centimeters or even some meters, e.g. for embedded working surfaces such as tables or desks, and the dimension of the apertures may range from 1 mm to several centimeters, e.g. 3 cm, according to operating frequency of the oscillator OR and to specific applications (dimensions of the object to be supplied/charged), while the distance between apertures may range from 0.5 mm to several millimeters, e.g. 5 mm.

The injector LR comprises of a flat coil having a first terminal FA, a second terminal FC and an intermediate tap FB; these are electrically connected to connection F.

The injector LR is spaced from the lower wall of the housing CS by means of electrically isolating spacers DS. In this way, very limited energy is transferred to the metallic lower wall through induction.

Figure 5:
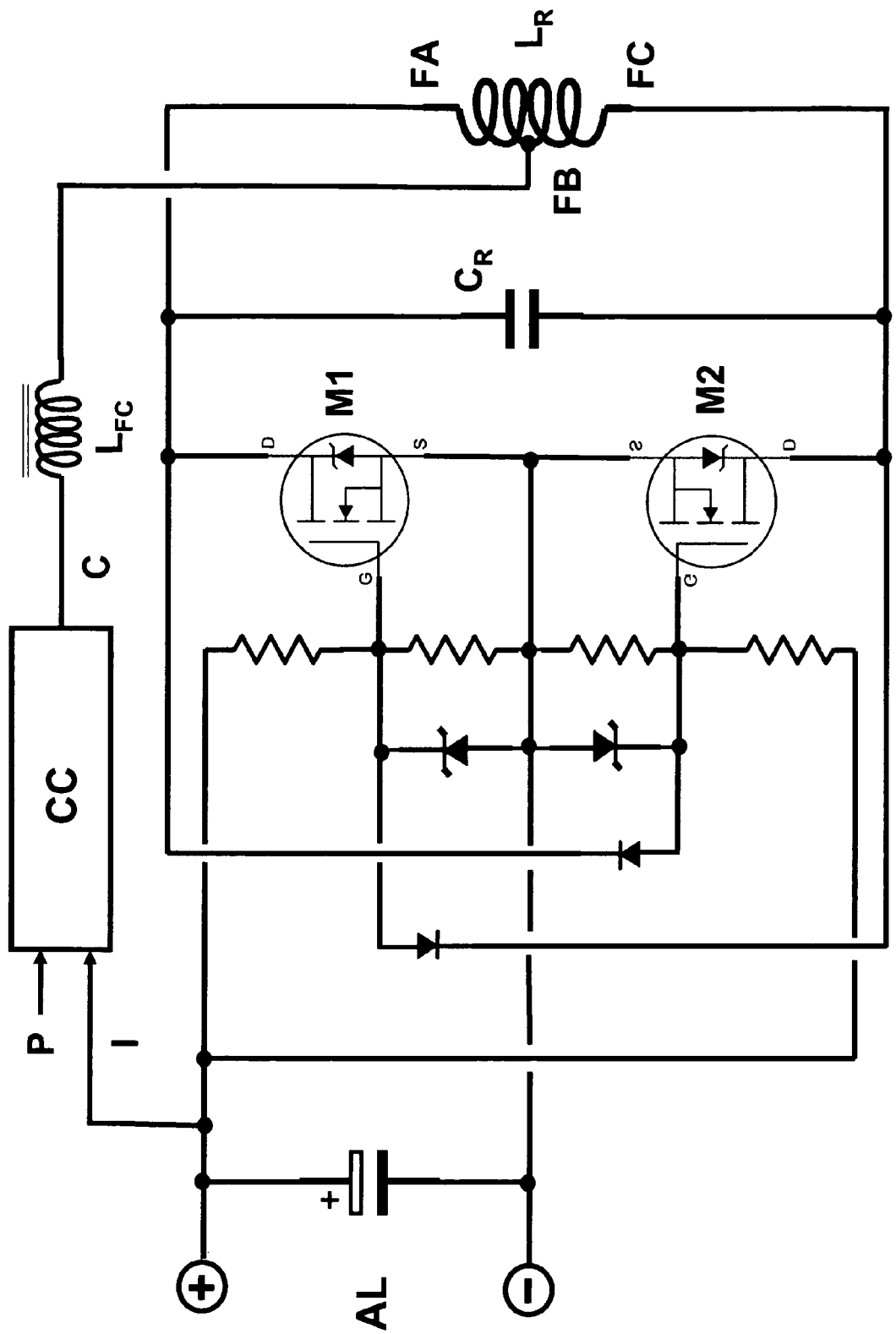
FIG. 5 shows a detailed schematic diagram of the oscillator of FIG. 3.

FIG. 5 shows a schematic diagram of the oscillator OR of FIG. 3. This figure also shows the unit CC as connected to the oscillator OR (connections C and I) and the injector LR as connected to the oscillator OR (connections FA, FB, FC, corresponding to connection F of FIG. 3).

The oscillator of FIG. 5 is a Royer oscillator; a capacitor CR is connected in parallel to the inductor LR (that is the injector located inside the space of the housing CS) so that a resonator or resonant circuit is formed; two transistors M1 and M2 (in particular MOSFET transistors) alternatively and repeatedly close and open so that the current flowing in the resonator is repeatedly reversed; the frequency of oscillation of the resonator is determined by the values of the capacitor CR and the inductor LR (i.e.

$$\left(\text{i.e. } f = \frac{1}{2\pi\sqrt{L_R * C_R}}\right).$$

The oscillator receives electric DC power either from a battery of from a regulated power supply (both not shown in the figure) through an input AL. A filter electrolytic capacitor C1 is advantageously connected in parallel with input AL. The intermediate tap FB of inductor LR is connected to the output C of unit CC through an inductor LFC (which belongs to the oscillator); when the output C of unit CC is grounded the oscillator can not oscillate, when the output C of unit CC is at power supply voltage level the oscillator can oscillate. The input I of unit CC is connected to the positive terminal of the power supply means that electrically powers the oscillator.

According to the specific embodiment of FIG. 5, the operating frequency is 95 KHz, capacitor CR is 330 nF, inductor LR is 8.6 µH and the Q of the resonant circuit is preferably very high. Such an oscillator is quite stable, also due to the low oscillating frequency, and there is no need to use a quartz.

Figure 6:
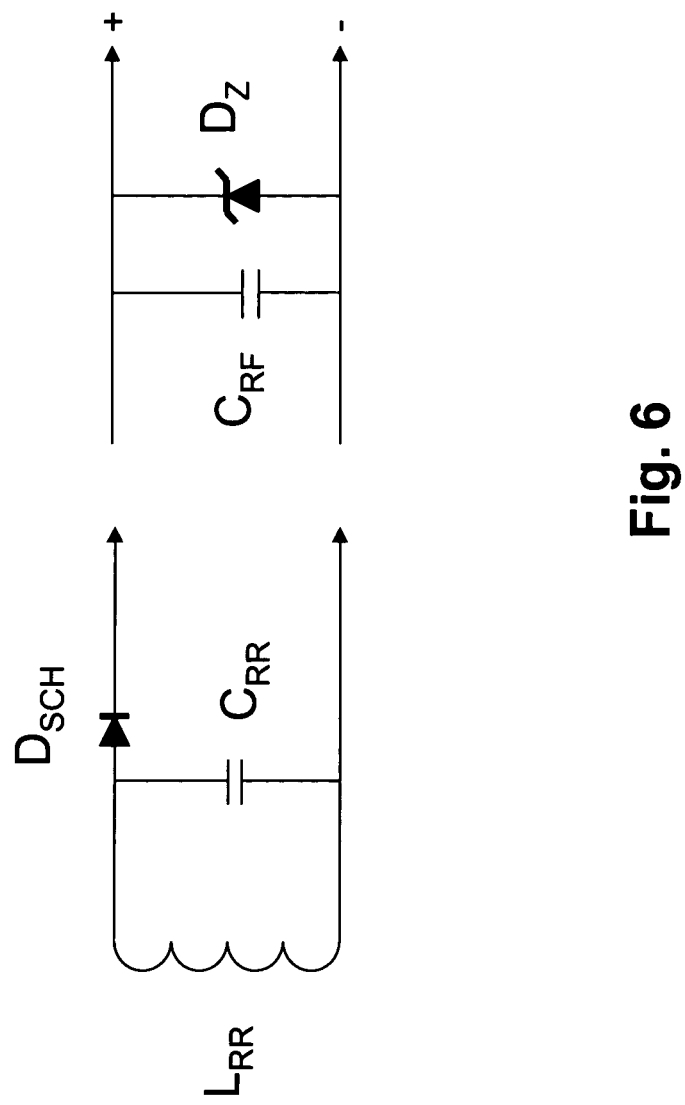
FIG. 6 shows a schematic diagram of a very simple implementation of the energy reception device of FIG. 3.

FIG. 6 shows a very simple implementation of device RCE of FIG. 3. This is split into two parts.

On the left side, there are the essential components for receiving the electromagnetic waves and converting them into a non-alternating electric current (it is indeed a pulsating current). This consists of an inductor LRR and a capacitor CRR connected in parallel and a diode DSCH (in particular a Schottky diode) for rectifying the current; the frequency of oscillation is given by the values of the inductor LRR and the capacitor CRR (i.e.

$$\left(\text{i.e. } f = \frac{1}{2\pi\sqrt{L_{RR} * C_{RR}}}\right)$$

and ideally the frequency of device TCE and the frequency of device RCE should be identical in order to maximise the energy transfer. Instead of a simple diode, a diode bridge may advantageously be used to increase the electric power provided at the output of this first part.

According to the specific embodiment of FIG. 6, the operating frequency is 95 KHz, capacitor CRR is 180 nF, inductor LRR is 15.76 µH and the Q of the resonant circuit is preferably very high. It is to be noted that the capacitor CRR is smaller than the capacitor CR and the inductor LRR is bigger than the inductor LR, while the operating frequencies of the two resonant circuits are the same; in this way, it is easier to integrate the capacitor of the reception device into a small portable electronic device.

On the right side, there are the essential components for converting the pulsating current into a constant voltage DC current; regulation of the voltage is important as the electrical signal due to the reception of the electromagnetic waves may vary. This consists of a capacitor CRF and a diode DZ (in particular a Zener diode) connected in parallel. Instead of this simple circuit, more complicated and efficient circuits may be used, for example a buck converter.

Figure 7:
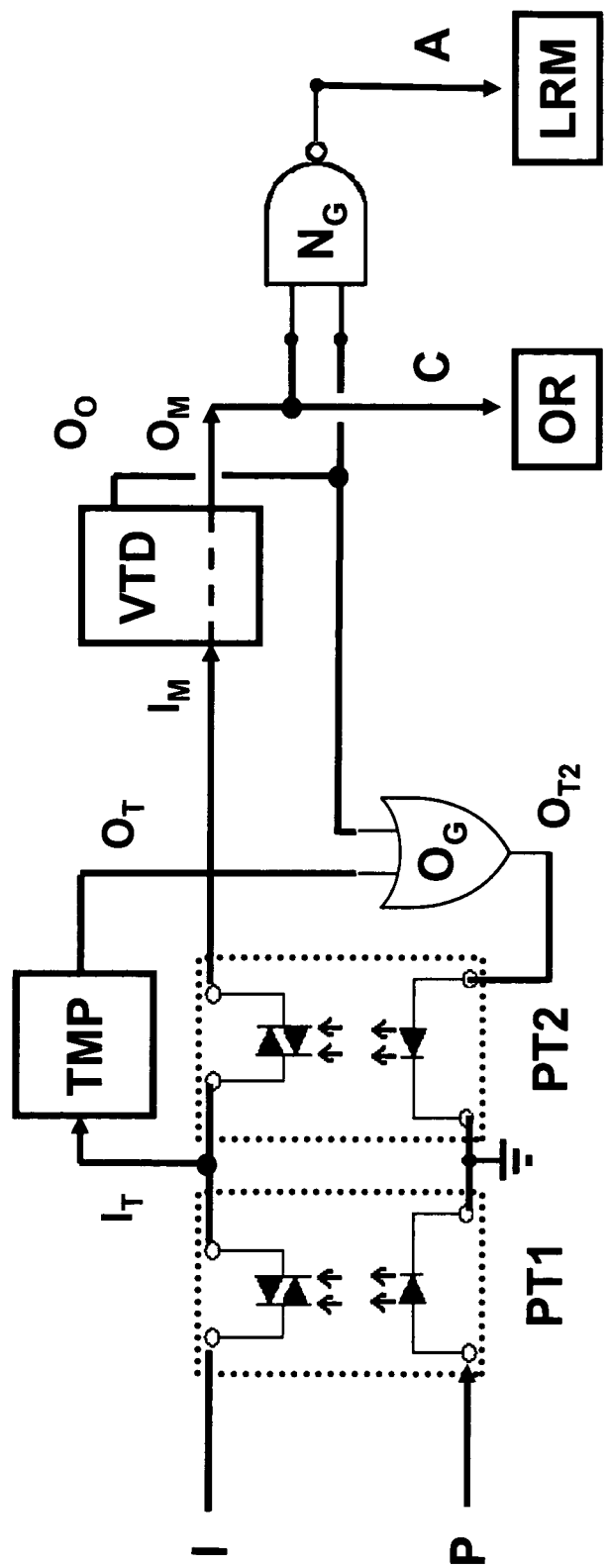
FIG. 7 shows a block diagram of the control unit of FIG. 3.

FIG. 7 shows a block diagram of unit CC of FIG. 3. According to this embodiment, unit CC switch the oscillator OR off if the weight sensors do not measure any substantial weight (i.e. nothing is leant on the wall EE) or if the current flowing into the oscillator OR (from the power supply) is below a predetermined lower threshold (i.e. what is leant on the wall EE does not resonate, thus does not act like a low impedance load, thus does not receive a lot of electromagnetic energy, thus the oscillator does not generate a lot of electromagnetic energy).

Figure 8:
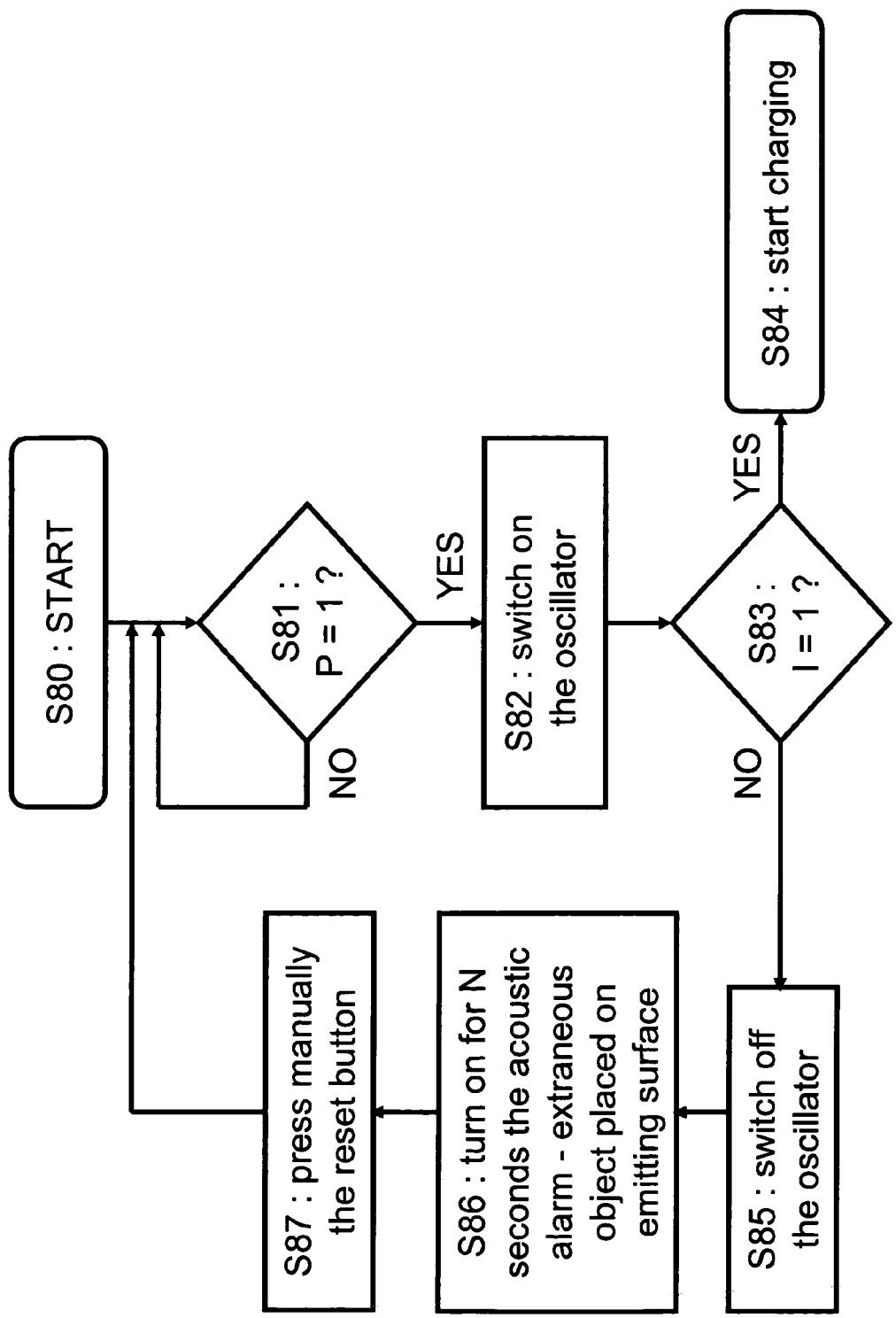
FIG. 8 shows a flow chart describing the functionality provided by the control unit of FIG. 3.

First of all, the functionality provided by the unit CC of FIG. 7 will be described with reference to the flow chart of FIG. 8.

At a certain point in time the monitoring process of unit CC is started (step S80). The signal coming from the weight sensors through connection P is checked (step S81); if weight is not detected (answer "NO") weight is continuously monitored; otherwise (answer "YES") the oscillator OR is switched on (step S82); afterwards, the signal coming from oscillator OR through connection I is checked (step S83); if the current flowing into oscillator OR is sufficiently high (answer "YES") the oscillator is kept on and the transfer of energy for e.g. charging a battery pack is officially started (step S84); otherwise (answer "NO"), the oscillator OR is switched off (step S85); afterwards, an alarm is activated for N seconds (step S86) as an extraneous object is placed on the emission surface EE; afterwards, a reset button is pressed manually (step S87) and the process may start again from the beginning (step S81).

The circuit of FIG. 7 is adapted to connect/disconnect the power supply voltage received from connection I (which is connected to the positive terminal of the power supply internally to the oscillator OR) to/from connection C (basically the oscillator OR, more specifically the intermediate tap of coil LR through inductor LFC) in relation to the voltage information carried by connection P and the current information carried by connection I.

This circuit comprises two phototriacs PT1 and PT2 (a phototriac is a 4-terminals controlled switch); phototriac PT1 is controlled by the voltage signal received from connection P; phototriac PT2 is controlled by the voltage signal output (OT2) from an OR gate OG; the main conduction paths of phototriacs PT1 and PT2 are connected in series to the connection I. If the voltage at connection P is low (no weight upon the emitting wall EE), the phototriac PT1 is open, thus the oscillator OR can not oscillate as the power supply voltage can not reach the intermediate tap of coil LR.

The intermediate tap between phototriacs PT1 and PT2 is connected to an input terminal IT of a programmable timer TMP; timer TMP has an output terminal OT connected to one of the inputs of OR gate OG. When a positive voltage is provided at the input of timer TMP a positive voltage pulse of predetermined duration (e.g. few seconds) is generated at its output. This means that as soon as the power supply voltage is provided at the input of the circuit of FIG. 7, also the phototriac PT2 closes, as one of the inputs of gate OG goes high, and thus also its output goes high and consequently drives the control input of phototriac PT2.

Therefore, at the beginning, when the power supply voltage is connected to connection I and if a weighty object is leant on wall EE, both phototriacs PT1 and PT2 are closed and the power supply voltage can reach the intermediate tap of coil LR (through device VTD and inductor LFC).

The output of the series connection of phototriacs PT1 and PT2 is connected to the main input IM of a device VTD; the device VTD has a main output OM that is connected to the connection C and a status output OO; its main input IM is connected to its main output OM through an internal current detector (e.g. essentially a very low value sense resistor); the internal current detector and an internal voltage threshold detector connected thereto provide at the status output OO a voltage signal that is high if the detected current exceeds a predetermined value, i.e. a lower threshold, and is low if the detected current does not exceed this predetermined value.

As already explained, the value of the current supplied by the power supply means to the oscillator OR is proportional to the electromagnetic field transmitted by device TCE and received by device RCE; therefore, the above mentioned comparison allows determining whether a resonant object is leant on wall EE.

The status output OO is connected to the other input of OR gate OG; therefore, when a resonant object is leant on wall EE, phototriac PT2 remains closed even after the end of the pulse generated by timer TMP and energy is transferred from device TCE to device RCE.

The two outputs OM and OO of device VTD are connected to the two inputs of a NAND gate NG; the output of gate NG is connected through a connection A to an alarm signalling device LRM; signalling may occur through light and/or sound indications. An alarm is activated when both the following conditions are met: (1) a weighty object is leant on wall EE (i.e. the main output OM is high), and (2) there is an emitted electromagnetic field but it is low (i.e. the status output OO is high).

It is to be noted that the circuit of FIG. 7 provides also an automatic "switch-off" function when the system according to the present invention is used as a battery charger. In fact, when a battery is fully charged by device RCE, no power or very little power is provided by device TCE and therefore no current or little current is used by oscillator OR; when this condition occurs, the status output OO of device VTD goes low and the oscillator OR is switched off.

An additional feature could be added to the circuit of FIG. 7. If device VTD would be able to compare the input flowing current not only with a lower threshold but also with an upper threshold, both the alarm and the oscillator could be activated/deactivated in relation also to the condition when the electromagnetic field is short-circuited (for example a metal object is leant on wall EE); this condition may damage e.g. the oscillator as an extremely high current would flow through its components.

Figure 9C:
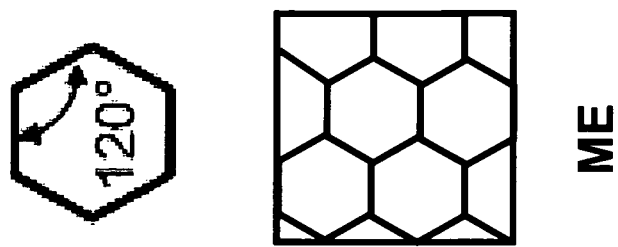
FIG. 9 shows three different possibilities of the apertures that can be used in a system according to the present invention.
Figure 9B:
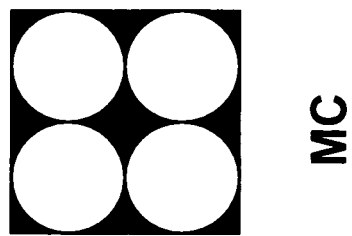
Figure 9A:
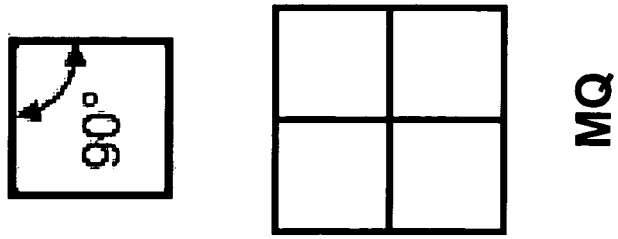

As already mentioned, the apertures may have different shapes; FIG. 9 shows three different possibilities: a plurality of closely adjacent square apertures MQ (FIG. 9A), a plurality of closely adjacent circle apertures MC (FIG. 9B), and a plurality of closely adjacent hexagon apertures ME (FIG. 9C).

The most advantageous solution is the one using hexagon apertures, even if all these possibilities (and many others) can be used.

In fact, the circle apertures leave a certain degree of area closed and therefore not radiating.

The difference between the square apertures and the hexagon apertures lies in the angle between adjacent sides of the two conducting polygons: while this angle is 90° for a square aperture, it is 120° for a hexagon aperture. Due to the fact that an angle is a source of losses for the electromagnetic field, the smaller the angle the higher the losses.

Alternatives to the Embodiment

The above described embodiment of the present invention may be changed in many different ways.

The shape and the size of the housing may be quite different from that of FIG. 3 and FIG. 4.

The injector may comprise more than one coil; in the case of a set of coils, the system may comprise a single oscillator or a corresponding set of oscillators.

The coil of the injector may have a circular, rectangular, or other shape and be arranged in two or three dimensions.

The distance from the energy emitting device to the energy receiving device may vary from about 1 mm to several cm, depending on the embodiment.

Depending on the size of the emitting surface, one or more energy receiving devices may be associated to the energy emitting device.

The oscillator may be adapted to generate sinusoidal electrical signals of different amplitudes (for example two or three or four or more different values); in this case, the control unit may be adapted to determine the amplitude of the generated sinusoidal signal.

The system may comprise additionally an on/off switch and/or a wake/sleep button (this can be used also for resetting the system).

Finally, it is to be noted that, due to the very low interferences generated by the system according to the present invention, it is perfectly possible to use the electronic device while they receive energy from such system; for example, while charging a mobile phone it is possible to use it leaving it leant on the emitting device.

The invention claimed is:
1. System for transferring energy wirelessly comprising:
a housing including a plurality of housing walls defining a space, at least a wall of said housing configured to be placed adjacent to an electromagnetic energy reception device,
an oscillator configured to generate an electrical signal, and an injector configured to receive the electrical signal supplied by said oscillator, and configured to inject electromagnetic waves into said space, wherein a cutoff frequency and a cutoff wavelength are associated with said housing, wherein said walls are electrically conducting walls, a frequency of the electromagnetic waves is lower than said cutoff frequency, and said wall comprises at least one aperture, wherein said at least one aperture has a size smaller than a wavelength of the electromagnetic waves so that an evanescent electromagnetic field is emitted from said at least one aperture.

2. System according to claim 1, wherein said wall comprises a plurality of apertures adjacent to each other, wherein each of said apertures has a size smaller than said wavelength of the electromagnetic waves so that an evanescent electromagnetic field is emitted from said apertures.

3. System according to claim 1, wherein a shape of said at least one aperture is hexagonal.

4. System according to claim 1, wherein said frequency of the electromagnetic waves is at least ten times lower than said cutoff frequency.

5. System according to claim 1, wherein the size of said at least one aperture is at least ten times smaller than said wavelength of the electromagnetic waves.

6. System according to claim 1, wherein said frequency of the electromagnetic waves is smaller than 100 KHz.

7. System according to claim 2, wherein said apertures have a size between 1 millimeter and 3 centimeters and a distance between adjacent apertures between 0.5 millimeters and 5 millimeters.

8. System according to claim 2, wherein said apertures are equally spaced over said wall.

9. System according to claim 1, wherein said injector comprises at least one coil located inside said space and said oscillator is connected to said at least one coil for providing electric energy thereto.

10. System according to claim 9, wherein said coil is spaced apart from said housing walls.

11. System according to claim 1, further comprising at least one sensor for detecting whether an object is leant on said wall.

12. System according to claim 11, wherein said at least one detecting sensor is a weight sensor.

13. System according to claim 9, further comprising a control unit connected to said oscillator and to said at least one detecting sensor, and configured to control the electric energy provided to said at least one coil in relation to signals received from said at least one detecting sensor.

14. System according to claim 1, comprising a measuring sensor configured to measure the emitted evanescent electromagnetic field.

15. System according to claim 9, comprising a measuring sensor configured to measure the emitted evanescent electromagnetic field, wherein said measuring sensor is a current sensor connected to said oscillator in such a way as to measure its electric energy consumption.

16. System according to claim 14, further comprising control unit connected to said oscillator and to said measuring sensor, and configured to control the emitted evanescent electromagnetic field in relation to signals received from said measuring sensor.

17. System according to claim 1, further comprising an alarm device configured to signal when the emitted evanescent electromagnetic field is below a predetermined lower threshold and/or is above a predetermined upper threshold.

* * * * *

UNITED STATES PATENT AND TRADEMARK OFFICE
CERTIFICATE OF CORRECTION

PATENT NO. : 8,536,738 B2  Page 1 of 1
APPLICATION NO. : 13/319178
DATED : September 17, 2013
INVENTOR(S) : Valter Bella It is certified that error appears in the above-identified patent and that said Letters Patent is hereby corrected as shown below:

In the Claims

In Column 14, Claim 16, Lines 25 and 26:
Please delete "further comprising control unit" and insert --further comprising a control unit--.

Signed and Sealed this
Eleventh Day of March, 2014

Michelle K. Lee
*Deputy Director of the United States Patent and Trademark Office*